US009178933B1

(12) United States Patent
Soland

(10) Patent No.: US 9,178,933 B1

(45) Date of Patent: Nov. 3, 2015

(54) CONTENT RECOMMENDATION BASED ON CONTEXT

(71) Applicant: Google Inc., Mountain View, CA (US)

(72) Inventor: Michael Paul Soland, Cupertino, CA (US)

(73) Assignee: Google Inc., Mountain View, CA (US)

( * ) Notice: Subject to any disclaimer, the term of this patent is extended or adjusted under 35 U.S.C. 154(b) by 252 days.

(21) Appl. No.: 13/906,712

(22) Filed: May 31, 2013

(51) Int. Cl.
*G06F 15/16* (2006.01)
*H04L 29/08* (2006.01)

(52) U.S. Cl.
CPC .................................... *H04L 67/02* (2013.01)

(58) Field of Classification Search
CPC ..... G06F 67/02; G06F 21/552; G06F 21/554; G06Q 30/02; G06Q 30/0255; G06Q 30/0253; G06Q 30/0261; G06Q 30/0269; G06Q 30/0277
USPC ............... 709/203, 204, 206, 228; 705/14.64, 705/14.66, 7.29
See application file for complete search history.

(56) References Cited

U.S. PATENT DOCUMENTS 6,498,987 B1 * 12/2002 Kelly et al. ........................ 702/3
8,166,026 B1 * 4/2012 Sadler ........................... 707/725
2003/0149612 A1 * 8/2003 Berghofer et al. .............. 705/10
2005/0154531 A1 * 7/2005 Kelly et al. ........................ 702/3
2006/0041472 A1 * 2/2006 Lukose et al. .................. 705/14
2007/0033005 A1 * 2/2007 Cristo et al. ....................... 704/9
2007/0244750 A1 * 10/2007 Grannan et al. ................ 705/14
2008/0091518 A1 * 4/2008 Eisenson et al. ................ 705/10
2009/0106040 A1 * 4/2009 Jones ................................ 705/1
2011/0191200 A1 * 8/2011 Bayer et al. .................. 705/26.1
2011/0321175 A1 * 12/2011 Slater .............................. 726/28
2013/0073387 A1 * 3/2013 Heath ........................ 705/14.53
2013/0073389 A1 * 3/2013 Heath ........................ 705/14.54
2013/0073400 A1 * 3/2013 Heath ........................ 705/14.73
2013/0073473 A1 * 3/2013 Heath ........................... 705/319
2013/0227707 A1 * 8/2013 Gay et al. ........................ 726/27
2014/0024009 A1 * 1/2014 Nealon et al. ................. 434/362
2015/0006526 A1 * 1/2015 Duleba et al. ................. 707/728
2015/0127628 A1 * 5/2015 Rathod ......................... 707/710

* cited by examiner

*Primary Examiner* — Thu Ha Nguyen
(74) *Attorney, Agent, or Firm* — Patent Law Works LLP

(57) ABSTRACT

The disclosure includes a system and method for providing recommended content to a user. The system includes a processor and a memory storing instructions that when executed cause the system to: receive data describing one or more engagement actions performed by a user; generate an engagement profile associated with the user; receive data describing one or more images associated with the user, the one or more images including temporal data describing one or more timestamps and location data describing one or more locations; generate a location profile based on the one or more locations and the one or more timestamps; receive data describing one or more content items; determine one or more interest scores for the one or more content items; determine one or more recommended items based on the one or more interest scores; and provide the one or more recommended items to the user.

20 Claims, 7 Drawing Sheets

300

Receive Data Describing One Or More Engagement Actions Performed By User 302

Receive Location Data Describing One Or More Locations Associated With User 304

Generate Engagement Profile Using One Or More Engagement Actions 306

Generate Location Profile Using One Or More Locations 308

Receive Data Describing One Or More Content Items 310

Generate One Or More Interest Scores For One Or More Content Items 311

Rank One Or More Content Items 312

Generate One Or More Recommended Items 313

Provide One Or More Recommended Items To User 314

100
Social Network Server 101
Social Network Application 109
Content Application 103
Content Server 127
Content Application 103
102
104
Network 105
110
User Device 115n
User 125n
User Device 115a
Content Application 103
User 125a
108
114
134
Mobile Network 135
112
Mobile Device 145
Content Application 103

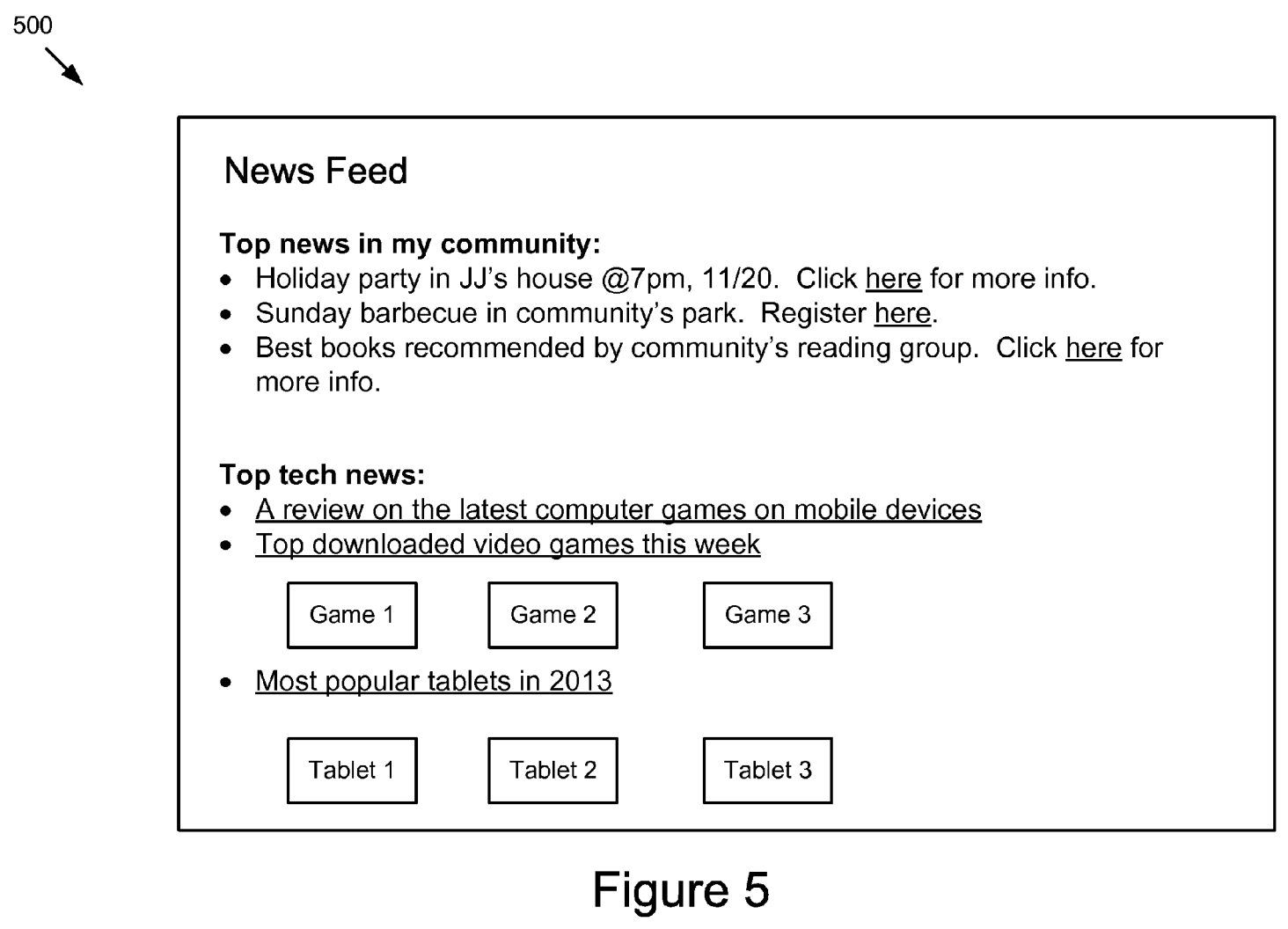

500

News Feed

Top news in my community:
- Holiday party in JJ's house @7pm, 11/20. Click here for more info.
- Sunday barbecue in community's park. Register here.
- Best books recommended by community's reading group. Click here for more info.

Top tech news:
- A review on the latest computer games on mobile devices
- Top downloaded video games this week Game 1 | Game 2 | Game 3

- Most popular tablets in 2013

Tablet 1 | Tablet 2 | Tablet 3

Figure 5

CONTENT RECOMMENDATION BASED ON CONTEXT

BACKGROUND

The specification relates to recommending content to a user.

A user can obtain news items from one or more websites. For example, a user can receive a news feed from a web server. However, the user may not be interested in the received news items. For example, the news items may not be relevant to the user's interest. In another example, the news items describe news associated with a location that may not be relevant to the user.

SUMMARY

According to one innovative aspect of the subject matter described in this disclosure, a system for providing recommended content to users includes a processor and a memory storing instructions that, when executed, cause the system to: receive data describing one or more first engagement actions performed by a first user; generate an engagement profile associated with the first user based on the one or more first engagement actions; receive data describing one or more images associated with the first user, the one or more images including temporal data describing one or more timestamps and location data describing one or more locations associated with the one or more images; generate a location profile associated with the first user based on the one or more locations and the one or more timestamps; receive data describing one or more content items; determine one or more interest scores for the one or more content items based on the engagement profile and the location profile; determine one or more recommended items from the one or more content items based on the one or more interest scores; and provide the one or more recommended items to the first user.

In general, another innovative aspect of the subject matter described in this disclosure may be embodied in methods that include: receiving data describing one or more first engagement actions performed by a first user; generating an engagement profile associated with the first user based on the one or more first engagement actions; receiving data describing one or more images associated with the first user, the one or more images including temporal data describing one or more timestamps and location data describing one or more locations associated with the one or more images; generating a location profile associated with the first user based on the one or more locations and the one or more timestamps; receiving data describing one or more content items; determining one or more interest scores for the one or more content items based on the engagement profile and the location profile; determining one or more recommended items from the one or more content items based on the one or more interest scores; and providing the one or more recommended items to the first user.

Other aspects include corresponding methods, systems, apparatus, and computer program products for these and other innovative aspects.

These and other implementations may each optionally include one or more of the following features. For instance, the operations include: receiving data describing a first location history associated with the first user from a mobile device; receiving data describing a second location history included in a user profile associated with the first user; receiving data describing one or more events associated with the first user; mapping the first location history, the second location history and the one or more events to one or more knowledge entities in a knowledge graph; generating the location profile based on the one or more mapped knowledge entities; determining a resharing recommendation for the first user, the resharing recommendation including data describing one or more second users recommended to the first user for sharing the one or more recommended items; providing the resharing recommendation to the first user; receiving data describing a source size and a source reputation for each data source that provides at least one of the one or more content items; adjusting the one or more interest scores based on the source size and the source reputation for each data source; receiving data describing one or more second engagement actions performed by one or more second users that are connected to the first user in a social graph, the one or more second engagement actions associated with at least one of the one or more content items; and adjusting the one or more interest scores based on the one or more second engagement actions.

For instance, the features include: mapping the one or more first engagement actions to one or more knowledge entities in a knowledge graph; generating the engagement profile including one or more engagement entities based on the one or more mapped knowledge entities; determining an engagement score for each engagement entity in the engagement profile; mapping the one or more locations to one or more knowledge entities in a knowledge graph; generating the location profile including one or more location entities based on the one or more mapped knowledge entities; associating the one or more location entities with the one or more timestamps; and determining a location score for each location entity in the location profile.

The present disclosure may be particularly advantageous in a number of respects. For example, the system can determine an engagement profile and a location profile associated with a user. The system generates one or more recommended items for the user based on the engagement profile and the location profile. For example, the system generates interest-based content items and/or location-based content items for the user using the engagement profile and the location profile. The system provides the one or more recommended items to the user. The system may also have numerous other advantages.

BRIEF DESCRIPTION OF THE DRAWINGS

The disclosure is illustrated by way of example, and not by way of limitation in the figures of the accompanying drawings in which like reference numerals are used to refer to similar elements.

FIG. 5 is a graphic representation of an example user interface for providing recommended content to a user.

DETAILED DESCRIPTION

Figure 1:
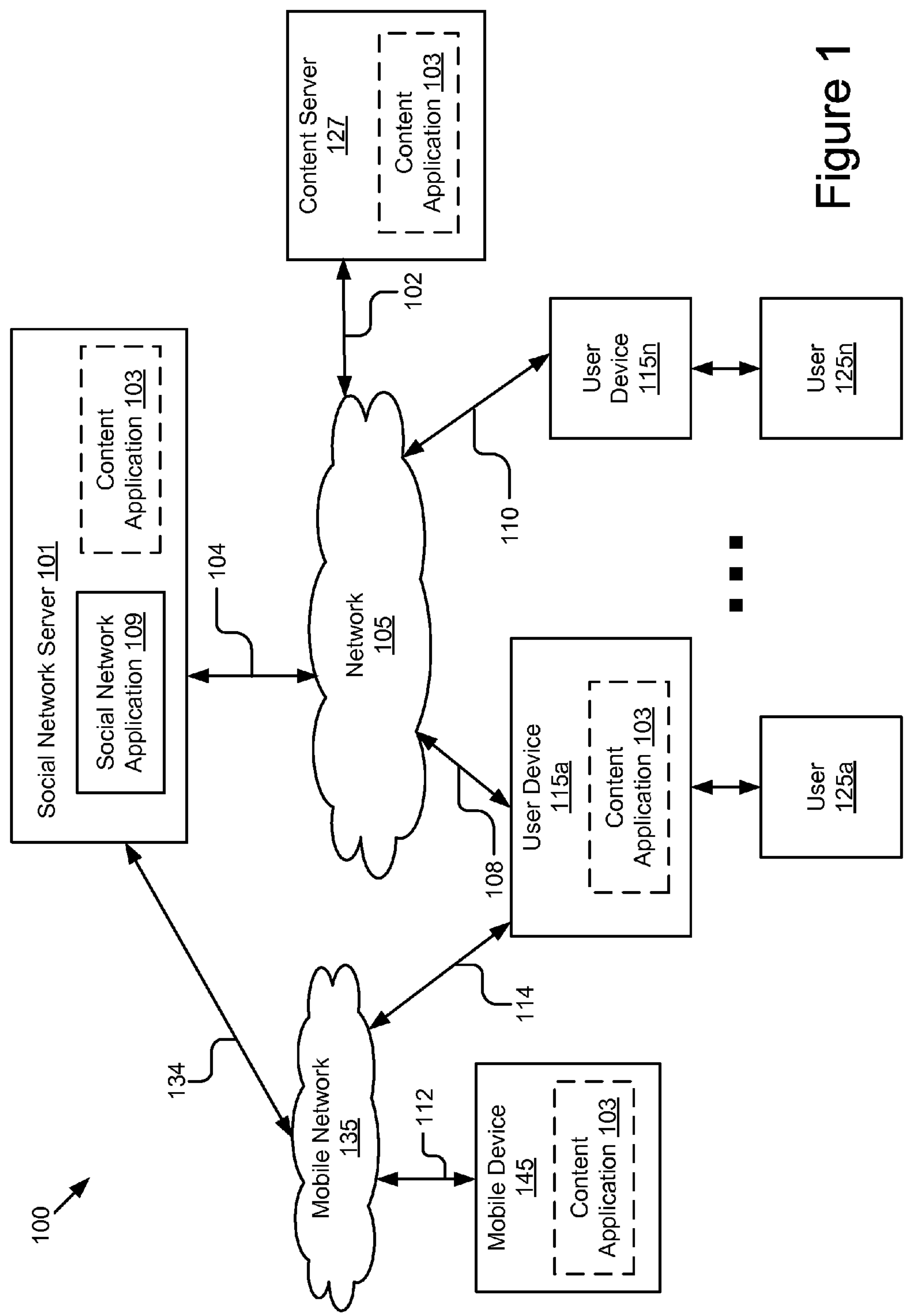
FIG. 1 is a block diagram illustrating an example system for providing recommended content to a user.

FIG. 1 illustrates a block diagram of some implementations of a system 100 for providing recommended content to a user. The illustrated system 100 includes user devices 115*a* . . . 115*n* that can be accessed by users 125*a* . . . 125*n*, a social network server 101, a content server 127 and a mobile device

145. In FIG. 1 and the remaining figures, a letter after a reference number, e.g., "115*a*," represents a reference to the element having that particular reference number. A reference number in the text without a following letter, e.g., "115," represents a general reference to implementations of the element bearing that reference number. In the illustrated implementation, these entities of the system 100 are communicatively coupled via a network 105 and/or a mobile network 135.

The user devices 115*a*, 115*n* in FIG. 1 are used by way of example. While FIG. 1 illustrates two user devices 115*a* and 115*n*, the present disclosure applies to a system architecture having one or more user devices 115. Furthermore, although FIG. 1 illustrates one network 105 and/or one mobile network 135 coupled to one or more of the user devices 115, the social network server 101, the mobile device 145 and the content server 127, in practice one or more networks 105 and/or one or more mobile networks 135 can be connected to these entities.

In some implementations, the content application 103 can be operable on the social network server 101, which is coupled to the network 105 via signal line 104 and the mobile network 135 via signal line 134. The social network server 101 can be a hardware server that includes a processor, a memory and network communication capabilities. In some implementations, the social network server 101 sends and receives data to and from one or more of the user devices 115*a*, 115*n*, the mobile device 145 and the content server 127 via the network 105 and/or the mobile network 135. The social network server 101 includes a social network application 109. A social network can be a type of social structure where the users may be connected by a common feature. The common feature includes relationships/connections, e.g., friendship, family, work, an interest, etc. The common features may be provided by one or more social networking systems including explicitly defined relationships and relationships implied by social connections with other online users, where the relationships form a social graph. In some examples, the social graph can reflect a mapping of these users and how they can be related. Furthermore, the social network server 101 and the social network application 109 may be representative of one social network and that there may be multiple social networks coupled to the network 105 and/or the mobile network 135, each having its own server, application and social graph. For example, a first social network may be more directed to business networking, a second may be more directed to or centered on academics, a third may be more directed to local business, a fourth may be directed to dating and others may be of general interest or a specific focus.

In some implementations, the content application 103 can be stored on a content server 127, which is connected to the network 105 via signal line 102. The content server 127 may be also coupled to the mobile network 135. In some implementations, the content server 127 can be a hardware server that includes a processor, a memory and network communication capabilities. The content server 127 sends and receives data to and from other entities of the system 100 via the network 105 and/or the mobile network 135. While FIG. 1 includes one content server 127, the system 100 may include one or more content servers 127.

In some implementations, the content application 103 can be stored on a user device 115*a*, which is connected to the network 105 via signal line 108 and the mobile network 135 via signal line 114. In some implementations, the user device 115*a*, 115*n* may be a computing device that includes a memory and a processor, for example a laptop computer, a desktop computer, a tablet computer, a mobile telephone, a personal digital assistant (PDA), a mobile email device, a portable game player, a portable music player, a reader device, a television with one or more processors embedded therein or coupled thereto or other electronic device capable of accessing a network 105 and/or a mobile network 135. In the illustrated implementation, the user 125*a* interacts with the user device 115*a*. The user device 115*n* is communicatively coupled to the network 105 via signal line 110. The user 125*n* interacts with the user device 115*n*. In some implementations, the content application 103 acts in part as a thin-client application that may be stored on the user devices 115*a*, 115*n* and in part as components that may be stored on one or more of the social network server 101 and the content server 127.

In some implementations, the content application 103 can be stored on a mobile device 145, which is connected to the mobile network 135 via signal line 112. In some implementations, the mobile device 145 may be a computing device that includes a memory and a processor, for example a laptop computer, a tablet computer, a mobile telephone, a personal digital assistant (PDA), a mobile email device, a portable game player, a portable music player, a mobile reader device or other mobile electronic device capable of accessing a mobile network 135. The user 125 may interact with the mobile device 145. Although FIG. 1 illustrates one mobile device 145, the system 100 can include one or more mobile devices 145.

The content application 103 can be code and routines for providing recommended content to a user. In some implementations, the content application 103 can be implemented using hardware including a field-programmable gate array (FPGA) or an application-specific integrated circuit (ASIC). In some other implementations, the content application 103 can be implemented using a combination of hardware and software. In some implementations, the content application 103 may be stored in a combination of the devices and servers, or in one of the devices or servers. The content application 103 is described below in more detail with reference to FIGS. 2-4C.

The network 105 can be a conventional type, wired or wireless, and may have numerous different configurations including a star configuration, token ring configuration or other configurations. Furthermore, the network 105 may include a local area network (LAN), a wide area network (WAN) (e.g., the Internet), and/or other interconnected data paths across which multiple devices may communicate. In some implementations, the network 105 may be a peer-to-peer network. The network 105 may also be coupled to or includes portions of a telecommunications network for sending data in a variety of different communication protocols. In some implementations, the network 105 includes Bluetooth communication networks or a cellular communications network for sending and receiving data including via short messaging service (SMS), multimedia messaging service (MMS), hypertext transfer protocol (HTTP), direct data connection, WAP, email, etc.

In some implementations, the mobile network 135 includes one or more of a wireless personal area network, a wireless local area network, a wireless mesh network, a wireless metropolitan area network, a wireless wide area network and a cellular network. For example, the mobile network 135 includes Bluetooth communication networks or a cellular communications network for sending and receiving data including via short messaging service (SMS), multimedia messaging service (MMS), hypertext transfer protocol (HTTP), direct data connection, WAP, email, etc.

Figure 2:
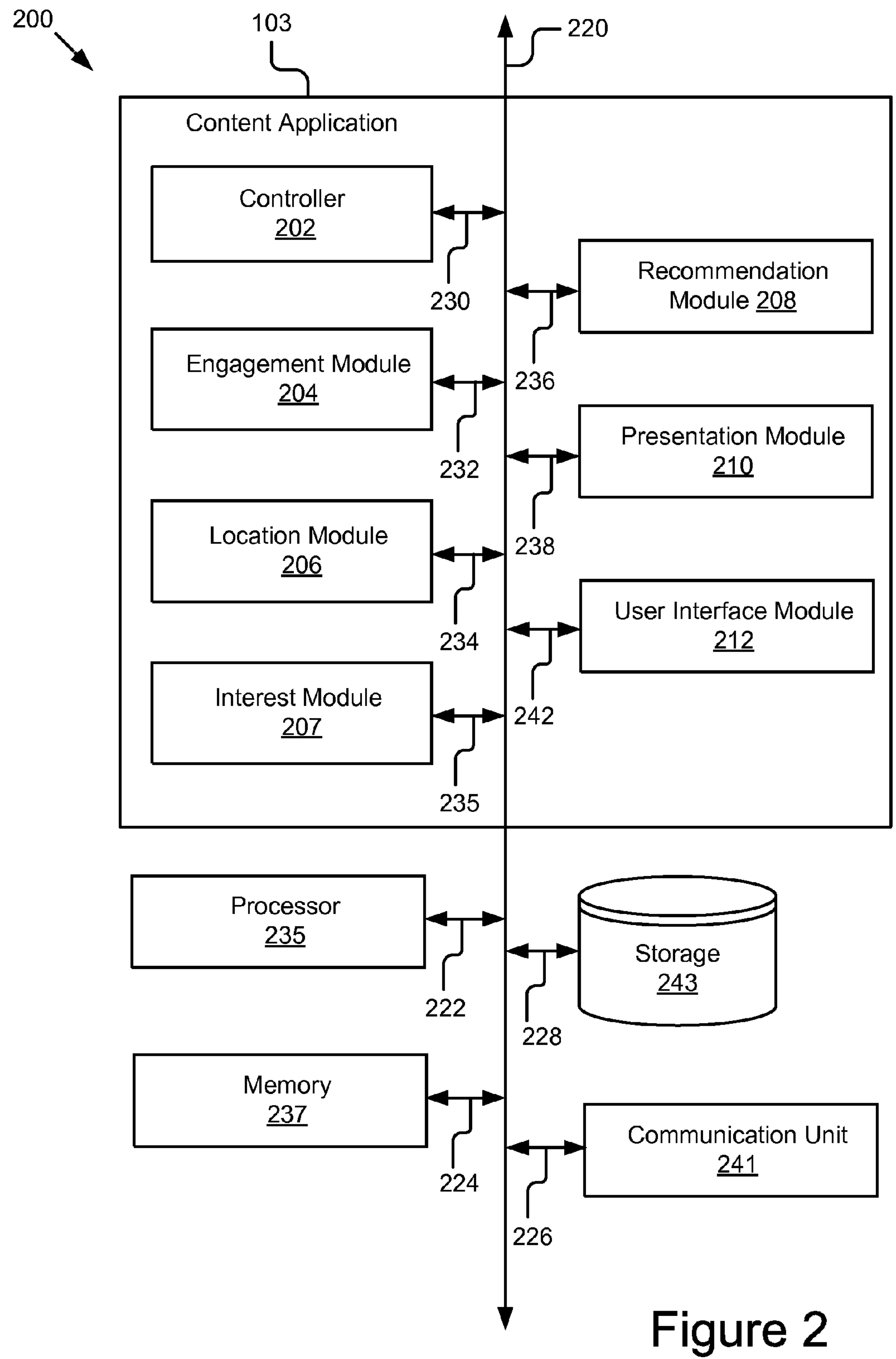
FIG. 2 is a block diagram illustrating an example of a content application.

Referring now to FIG. 2, an example of the content application 103 is shown in more detail. FIG. 2 is a block diagram of a computing device 200 that includes a content application 103, a processor 235, a memory 237, a communication unit 241 and a storage device 243 according to some examples. The components of the computing device 200 are communicatively coupled by a bus 220. In some implementations, the computing device 200 can be one of a social network server 101, a user device 115, a content server 127 and a mobile device 145.

The processor 235 includes an arithmetic logic unit, a microprocessor, a general purpose controller or some other processor array to perform computations and provide electronic display signals to a display device. The processor 235 is coupled to the bus 220 for communication with the other components via signal line 222. Processor 235 processes data signals and may include various computing architectures including a complex instruction set computer (CISC) architecture, a reduced instruction set computer (RISC) architecture, or an architecture implementing a combination of instruction sets. Although FIG. 2 includes a single processor 235, multiple processors 235 may be included. Other processors, operating systems, sensors, displays and physical configurations are possible.

The memory 237 stores instructions and/or data that may be executed by the processor 235. The memory 237 is coupled to the bus 220 for communication with the other components via signal line 224. The instructions and/or data may include code for performing the techniques described herein. The memory 237 may be a dynamic random access memory (DRAM) device, a static random access memory (SRAM) device, flash memory or some other memory device. In some implementations, the memory 237 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The communication unit 241 transmits and receives data to and from at least one of the user device 115, the mobile device 145, the content server 127 and the social network server 101 depending upon where the content application 103 may be stored. The communication unit 241 is coupled to the bus 220 via signal line 226. In some implementations, the communication unit 241 includes a port for direct physical connection to the network 105 or to another communication channel. For example, the communication unit 241 includes a USB, SD, CAT-5 or similar port for wired communication with the user device 115. In some implementations, the communication unit 241 includes a wireless transceiver for exchanging data with the user device 115 or other communication channels using one or more wireless communication methods, including IEEE 802.11, IEEE 802.16, BLUETOOTH® or another suitable wireless communication method.

In some implementations, the communication unit 241 includes a cellular communications transceiver for sending and receiving data over a cellular communications network including via short messaging service (SMS), multimedia messaging service (MMS), hypertext transfer protocol (HTTP), direct data connection, WAP, e-mail or another suitable type of electronic communication. In some implementations, the communication unit 241 includes a wired port and a wireless transceiver. The communication unit 241 also provides other conventional connections to the network 105 for distribution of files and/or media objects using standard network protocols including TCP/IP, HTTP, HTTPS and SMTP, etc.

The storage device 243 can be a non-transitory memory that stores data for providing the functionality described herein. The storage device 243 may be a dynamic random access memory (DRAM) device, a static random access memory (SRAM) device, flash memory or some other memory devices. In some implementations, the storage device 243 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. In the illustrated implementation, the storage device 243 is communicatively coupled to the bus 220 via signal line 228.

In some implementations, the storage device 243 stores one or more of: data describing engagement actions performed by a user; data describing one or more locations associated with a user; data describing one or more events associated with a user; image data describing one or more images associated with a user; data describing an engagement profile associated with a user; data describing a location profile associated with a user; data describing an interest score associated with a content item; data describing one or more recommended items relevant to a user; and data describing a knowledge graph and knowledge entities in the knowledge graph. The data stored in the storage device 243 is described below in more detail. In some implementations, the storage device 243 may store other data for providing the functionality described herein.

A knowledge graph can be data describing one or more objects and connections between the one or more objects. In some implementations, an object in the knowledge graph is referred to as a knowledge entity in the knowledge graph. Examples of an object in a knowledge graph include, but are not limited to, a person, a topic, an article, a device, a location, an entity of interest or an item of interest. In some implementations, a knowledge graph includes data describing various objects and connections between the various objects indicating various relationships between the various objects. For example, a knowledge graph includes an object "Isaac Newton" and data associated with the object "Isaac Newton" (e.g., date of birth, residence, nationality, occupation, contributions, etc.). The knowledge graph connects the object "Isaac Newton" to another object "Albert Einstein" because both objects represent famous physicists. The knowledge graph also connects the object "Isaac Newton" to a third object "the universal law of gravitation" because Isaac Newton made contributions to the discovery of the universal law of gravitation. The knowledge graph may also connect the object "Isaac Newton" to various other objects.

Example engagement actions include, but are not limited to, acknowledging a content item (e.g., endorsing a content item or disapproving a content item), marking a content item as a favorite item, commenting on a content item, reposting a content item, rating a content item and sharing a content item, etc. Example content items include, but are not limited to, an article, a news feed, a post, a comment, a video, an audio clip, a podcast, a social feed and a feed related to a subscribed topic, etc.

In the illustrated implementation shown in FIG. 2, the content application 103 includes a controller 202, an engagement module 204, a location module 206, an interest module 207, a recommendation module 208, a presentation module 210 and a user interface module 212. These components of the content application 103 are communicatively coupled to each other via the bus 220.

The controller 202 can be software including routines for handling communications between the content application 103 and other components of the computing device 200. In some implementations, the controller 202 can be a set of instructions executable by the processor 235 to provide the functionality described below for handling communications between the content application 103 and other components of the computing device 200. In some implementations, the controller 202 can be stored in the memory 237 of the computing device 200 and can be accessible and executable by the processor 235. The controller 202 may be adapted for cooperation and communication with the processor 235 and other components of the computing device 200 via signal line 230.

The controller 202 sends and receives data, via the communication unit 241, to and from one or more of a user device 115, a mobile device 145, a content server 127 and a social network server 101. For example, the controller 202 receives, via the communication unit 241, data describing a location history associated with a user form a mobile device 145 and sends the data to the location module 206. In another example, the controller 202 receives graphical data for providing a user interface to a user from the user interface module 212 and sends the graphical data to a user device 115, causing the user device 115 to present the user interface to the user.

In some implementations, the controller 202 receives data from other components of the content application 103 and stores the data in the storage device 243. For example, the controller 202 receives graphical data from the user interface module 212 and stores the graphical data in the storage device 243. In some implementations, the controller 202 retrieves data from the storage device 243 and sends the retrieved data to other components of the content application 103. For example, the controller 202 retrieves data describing a location profile from the storage 243 and sends the data to the interest module 207.

The engagement module 204 can be software including routines for determining an engagement profile associated with a user. In some implementations, the engagement module 204 can be a set of instructions executable by the processor 235 to provide the functionality described below for determining an engagement profile associated with a user. In some implementations, the engagement module 204 can be stored in the memory 237 of the computing device 200 and can be accessible and executable by the processor 235. The engagement module 204 may be adapted for cooperation and communication with the processor 235 and other components of the computing device 200 via signal line 232.

An engagement profile can be data describing an engagement pattern associated with a user. In some implementations, an engagement profile includes one or more engagement entities and an engagement score for each engagement entity. An engagement entity can be an object that a user may be engaged in. For example, an engagement entity can be a topic, a community, a hashtag or another subject engaged by a user. In some implementations, an engagement entity can be a knowledge entity that matches an engagement action performed by a user. An engagement score can be data indicating a degree of user engagement for an engagement entity. For example, assume a user endorses 20 content items related to a first topic and 3 content items related to a second topic. An engagement profile associated with the user includes a first engagement entity (e.g., the first topic) and a second engagement entity (e.g., the second topic), where the first engagement entity has a different engagement score than the second engagement entity indicating that the user is more engaged in the first topic than the second topic. For example, the first engagement entity could have a higher engagement score than the second engagement entity.

In some implementations, the engagement module 204 receives data describing one or more engagement actions performed by a user from a social network server 101. The one or more engagement actions relate to one or more content items. For example, the one or more engagement actions indicate the user endorses or shares the one or more content items. In some implementations, the engagement module 204 receives temporal data describing one or more timestamps associated with the one or more engagement actions. For example, a timestamp indicates a time when a user performs an engagement action.

The engagement module 204 generates an engagement profile for the user based on the one or more engagement actions. For example, the engagement module 204 maps the one or more engagement actions to one or more knowledge entities in a knowledge graph and generates one or more engagement entities to be the one or more mapped knowledge entities. For example, assume a user endorses a computer game XYZ played on smart phones. The engagement module 204 maps the user's endorsement to a first knowledge entity "computer game XYZ" and a second knowledge entity "smart phone" in a knowledge graph, and generates an engagement profile for the user that includes the first mapped knowledge entity "computer game" and the second mapped knowledge entity "smart phone."

In another example, assume a user has endorsed news items provided in a news feed. The engagement module 204 parses the endorsed news items using machine learning techniques and obtains one or more topics related to the news items. The engagement module 204 associates the one or more topics with a user object in the knowledge graph. A user object can be an object that represents a user in a knowledge graph. For example, the engagement module 204 connects the one or more topics to the user object in the knowledge graph, where the one or more topics represent one or more user interests. The engagement module 204 generates an engagement profile that includes the one or more topics as one or more engagement entities.

In some implementations, the engagement module 204 determines an engagement score for each engagement entity in the engagement profile. In some instances, the engagement module 204 determines an engagement score for each engagement entity based on the number of the user's engagement actions associated with the engagement entity. For example, assume a user has endorsed 20 news items in total, with 15 out of the 20 news items being mapped to a first engagement entity "video game" and 10 out of the 20 new items being mapped to a second engagement entity "smart phone." The engagement module 204 generates an engagement score for the first engagement entity "video game" that indicates a more engaged user than the second engagement entity "smart phone," since the first engagement entity "video game" relates to more engagement actions from the user. For example, the engagement score for the first engagement entity is lower than the second engagement entity if a lower score is indicative of a more engaged user.

In some instances, the engagement module 204 determines an engagement score for each engagement entity based on recency of the user's engagement actions associated with the engagement entity. For example, the engagement module 204 generates an engagement score for a first engagement entity that indicates that the first engagement entity is more engaging than a second engagement entity if the first engagement entity relates to a more recent timestamp than the second engagement entity. For example, the first engagement entity could have a higher score than the second engagement entity where a higher score is indicative of more engagement.

In some implementations, the engagement module 204 stores data describing the engagement profile in the storage device 243. In some implementations, the engagement module 204 sends data describing the engagement profile to the interest module 207.

The location module 206 can be software including routines for determining a location profile associated with a user. In some implementations, the location module 206 can be a set of instructions executable by the processor 235 to provide the functionality described below for determining a location profile associated with a user. In some implementations, the location module 206 can be stored in the memory 237 of the computing device 200 and can be accessible and executable by the processor 235. The location module 206 may be adapted for cooperation and communication with the processor 235 and other components of the computing device 200 via signal line 234.

A location profile can be data describing a location pattern associated with a user. For example, a location profile indicates a user lived in California during 1990-2000 and moved to New York since 2001. In some implementations, a location profile includes one or more location entities and a location score for each location entity. Example location entities include, but are not limited to, a location where a user comes from, a location where a user lived in the past, a location where a user worked in the past, a location that a user has visited (e.g., a user's past vacation spots), a user's check-in location, a current home address, a current work address or a location that a user plans to visit (e.g., a destination of a future trip). Other example location entities are possible. A location score can be data indicating a degree of user affinity to a location entity. For example, a destination of a future trip in two days has a higher location score (or a lower location score if a lower location score is indicative of a higher degree of user affinity) than a destination of a past trip 2 years ago. In another example, a location entity endorsed by a user has a higher location score than other location entities without user endorsements. In some implementations, a location score associated with a location entity can be determined based on a frequency of visits to the location entity. For example, assume a user visits a vacation spot at the same time every year, which indicates that the user may be emotionally attached to the vacation spot. A location score associated with the vacation spot can be determined based on the number of visits to the vacation spot.

In some implementations, the location module 206 receives data describing a first location history associated with a user from a mobile device 145 with the consent from the user. The first location history includes one or more locations that the user visited in the past and one or more timestamps associated with the one or more locations. For example, the first location history describes one or more locations checked in by the user using the mobile device 145 and one or more timestamps associated with the location check-ins. In some implementations, a timestamp describes a time when the user visited a location. In some other implementations, a timestamp indicates a time period when the user stayed at a location.

In some implementations, the location module 206 receives data describing a second location history associated with the user from a social network server 101 with the consent from the user. The second location history includes one or more locations in a user profile associated with the user and one or more timestamps associated with the one or more locations. For example, the second location history includes a historical home address from the user profile and a timestamp indicating a time period when the user stayed at the historical home address.

In some implementations, the location module 206 receives event data describing one or more events associated with the user from the social network server 101 with the consent from the user. For example, the location module 206 receives data describing one or more calendar events (e.g., appointments), sport events and multi-user communication session events associated with the user from the social network server 101. The event data includes location data describing a location where an event occurs and temporal data describing a time or a time period when the event occurs.

In some implementations, the location module 206 receives data describing one or more images associated with the user from the social network server 101 with the consent from the user. For example, the location module 206 receives data describing one or more images published by the user or by another user that connects to the user in a social graph. In some examples, the user may be tagged in the one or more images. The one or more images may explicitly or implicitly include location data describing one or more locations associated with the one or more images. For example, the one or more images depict one or more landmarks (e.g., the statue of liberty, a symbolic building in a city, etc.). In another example, the one or more images may be tagged with one or more locations when uploaded to the social network server 101. The one or more images may also include temporal data describing one or more timestamps. For example, a timestamp indicates a time when an image was taken. In another example, a timestamp indicates a time when an image was published.

In some instances, the user tags himself or herself to the one or more images. The user may also tag one or more locations to the one or more images. In some instances, another user tags the user to the one or more images. For example, a friend tags the user to the one or more images. The other user may also tag one or more locations to the one or more images. In some other instances, a computing device (e.g., the social network server 101, the content server 127, the user device 115 or the mobile device 145) automatically determines one or more objects depicted in the one or more images and tags the one or more objects to the one or more images. For example, the computing device determines one or more users depicted in the one or more images and tags the one or more users to the one or more images with the consent from the one or more users. In another example, the computing device determines one or more landmarks depicted in the one or more images and tags the one or more images with the one or more landmarks. In yet another example, the computing device determines an internet protocol (IP) address where the one or more images were uploaded and tags the IP address to the one or more images.

In some implementations, the location module 206 retrieves data describing one or more of the first location history, the second location history, the one or more events and the one or more images associated with the user from the user's public profiles hosted by one or more web servers. For example, the location module 206 retrieves data describing one or more images posted by the user from an image-sharing website. In another example, the location module 206 retrieves data describing a mailing address associated with the user from a web page published by the user.

The location module 206 generates a location profile for the user based on one or more of the first location history, the second location history, the one or more events and the one or more images. The location profile includes one or more location entities associated with the user. In some instances, the location module 206 maps the first location history and the second location history to one or more knowledge entities in a knowledge graph, and generates one or more location entities to be the one or more mapped knowledge entities. For example, if the first location history indicates that the user drives to work every weekday via a bridge, the location module 206 maps the first location history to a knowledge entity that represents the bridge in the knowledge graph. The location module 206 generates a location entity for the user as the mapped knowledge entity representing the bridge.

In some instances, the location module 206 determines one or more locations and one or more timestamps associated with one or more events. The location module 206 generates a location profile by: (1) configuring the one or more locations as one or more location entities; and (2) associating the one or more location entities with the one or more timestamps. For example, if a calendar event indicates that the user flies to Thailand on May 1, 2013 8:00 AM, the location module 206 maps the calendar event to a location entity "Thailand" and associates the location entity with the timestamp "May 1, 2013 8:00 AM."

In some instances, the location module 206 determines one or more locations and one or more timestamps associated with one or more images. The location module 206 generates a location profile by: (1) configuring the one or more locations as one or more location entities; and (2) associating the one or more location entities with the one or more timestamps. For example, assume an image depicting the statue of liberty was posted by the user in Dec. 1, 2012 10:50 AM. The location module 206 maps the image to a location entity "statue of liberty" and associates the location entity with the timestamp "Dec. 1, 2012 10:50 AM."

In some implementations, the location module 206 determines a location score for each location entity. For example, the location module 206 determines a location score for each location entity based on the number of visits to the location entity and/or the recency of the timestamp associated with the location entity. For example, if the user visited California every month last year and Hawaii once 5 years ago, the location module 206 generates a higher location score for the location entity "California" than the location entity "Hawaii" if the higher location score is indicative of the more relevant score. In another example, the location module 206 generates a higher location score for a first location entity representing a home city of the user than a second location entity representing a vacation spot visited by the user.

In some implementations, the location module 206 stores data describing the location profile in the storage device 243. In some implementations, the location module 206 sends data describing the location profile to the interest module 207.

The interest module 207 can be software including routines for determining one or more interest scores for one or more content items. In some implementations, the interest module 207 can be a set of instructions executable by the processor 235 to provide the functionality described below for determining one or more interest scores for one or more content items. In some implementations, the interest module 207 can be stored in the memory 237 of the computing device 200 and can be accessible and executable by the processor 235. The interest module 207 may be adapted for cooperation and communication with the processor 235 and other components of the computing device 200 via signal line 235.

In some implementations, the interest module 207 receives one or more content items from one or more data sources (e.g., the social network server 101, the content server 127 or other web servers). The interest module 207 determines one or more interest scores for the one or more content items based on one or more of an engagement profile and a location profile associated with the user as described below in more detail. An interest score can be data indicating a degree of user interest associated with a content item. For example, an interest score indicates a probability that a user may be interested in a content item.

In some instances, the interest module 207 parses a content item to determine one or more subjects associated with the content item and determines whether the one or more subjects match the engagement profile and/or the location profile. The interest module 207 determines an interest score for the content item based on one or more of: (1) a degree of match between the one or more subjects and the engagement profile; and (2) a degree of match between the one or more subjects and the location profile. For example, assume that: (1) the engagement profile includes red-hot engagement entities "computer game" and "smart phone;" (2) a first content item describes a review on the latest computer games on smart phones; and (3) a second content item describes a history of computer games. The interest module 207 generates an interest score for the first content item that indicates a higher interest in the first content item as compared to the second content item since the first content item matches both of the red-hot engagement entities.

In some instances, a first content item matching an engagement entity in a user's engagement profile has an interest score with a threshold difference as compared to a second content item that does not match engagement entities in the user's engagement profile. For example, the content item has a higher interest score than the second content item. In some instances, a first content item matching a location entity in a user's location profile has an interest score with a threshold difference as compared to a second content item that does not match location entities in the user's location profile. For example, in an instance where a lower interest score is indicative of a more interesting content item, the first content item has a lower interest score than the second content item.

In some instances, if a first engagement entity has a threshold difference in the engagement score as compared to a second engagement entity, then a first content item matching the first engagement entity has a with a threshold difference in the interest score as compared to than a second content item matching the second engagement entity. For example, a first content item matching a red-hot engagement entity has a higher interest score than a second content item matching other engagement entities. In some instances, if a first location entity has a threshold difference in the location score as compared to a second location entity, then a first content item matching the first location entity has a threshold difference in the interest score as compared to a second content item matching the second location entity. For example, a first content item matching a red-hot location entity "my community" has a higher interest score than a second content item that matches a location entity visited by the user 5 years ago.

In some implementations, the interest module 207 adjusts the one or more interest scores associated with the one or more content items. For example, the interest module 207 receives data describing one or more engagement actions performed by one or more other users on the one or more content items. The one or more other users connect to the user in a social graph. The interest module 207 adjusts the one or more interest scores based on the one or more engagement actions and/or relationship closeness between the user and the one or more other users. For example, the interest module 207 increases an interest score for a content item endorsed by a close friend of the user.

In some examples, the interest module 207 determines a source size, a source reputation and a source popularity for each data source that provides at least one of the one or more content items. The interest module 207 adjusts the one or more interest scores based on the source size, the source reputation and the source popularity associated with each data source. For example, the interest module 207 increases an interest score for a content item published by a famous publisher. In some examples, the interest module 207 adjusts the one or more interest scores based on the recency of the one or more content items.

In some implementations, the interest module 207 stores data describing the one or more interest scores in the storage 243. In some implementations, the interest module 207 sends data describing the one or more interest scores to the recommendation module 208.

The recommendation module 208 can be software including routines for determining one or more recommended items relevant to a user. In some implementations, the recommendation module 208 can be a set of instructions executable by the processor 235 to provide the functionality described below for determining one or more recommended items relevant to a user. In some implementations, the recommendation module 208 can be stored in the memory 237 of the computing device 200 and can be accessible and executable by the processor 235. The recommendation module 208 may be adapted for cooperation and communication with the processor 235 and other components of the computing device 200 via signal line 236.

In some implementations, the recommendation module 208 receives data describing one or more interest scores associated with one or more content items from the interest module 207. The recommendation module 208 ranks the one or more content items based on the one or more interest scores. The recommendation module 208 generates one or more recommended items from the one or more content items. For example, the recommendation module 208 determines one or more recommended items as one or more content items that have the highest rankings In some implementations, the one or more recommended items include one or more content items matching a user's interest. For example, the one or more recommended items match engagement entities in the user's engagement profile. In some implementations, the one or more recommended items include one or more content items matching a location associated with a user. For example, the one or more recommended items include news items related to a community where the user lived 2 years ago.

In some implementations, the recommendation module 208 determines a resharing recommendation for the user. The resharing recommendation can be data describing one or more second users recommended to the user for sharing the one or more recommended items. For example, the resharing recommendation includes a list of other users that the user can share the one or more recommended items with. In another example, the resharing recommendation includes one or more second users connected to the user via a social graph. In yet another example, the resharing recommendation includes one or more second users that connect to the user via a social graph and share one or more common engagement entities and/or common location entities with the user.

In some examples, the recommendation module 208 determines one or more second users that connect to the user in a social graph and have engagement profiles and/or location profiles matching the one or more recommended items. For example, for each of the one or more second users, the one or more recommended items match (1) at least one engagement entity in an engagement profile and/or (2) at least one location entity in a location profile associated with the respective second user. The recommendation module 208 generates a resharing recommendation that includes the one or more second users.

In some implementations, the recommendation module 208 sends data describing the one or more recommended items and the resharing recommendation to the presentation module 210. In some implementations, the recommendation module 208 stores data describing the one or more recommended items and the resharing recommendation in the storage 243.

The presentation module 210 can be software including routines for presenting one or more recommended items to a user. In some implementations, the presentation module 210 can be a set of instructions executable by the processor 235 to provide the functionality described below for providing one or more recommended items to a user. In some implementations, the presentation module 210 can be stored in the memory 237 of the computing device 200 and can be accessible and executable by the processor 235. The presentation module 210 may be adapted for cooperation and communication with the processor 235 and other components of the computing device 200 via signal line 238.

In some implementations, the presentation module 210 receives data describing one or more recommended items and/or a resharing recommendation from the recommendation module 208. The presentation module 210 provides the one or more recommended items and/or the resharing recommendation to the user. For example, the presentation module 210 instructs the user interface module 212 to generate graphical data for providing a user interface that depicts the one or more recommended items and/or the resharing recommendation to the user. In another example, the presentation module 210 sends data describing one or more recommended items (e.g., a podcast, audio news) to a user device 115, causing the user device 115 to play the one or more recommended items in a speaker system (not shown) connected to the user device 115.

The user interface module 212 can be software including routines for generating graphical data for providing user interfaces to users. In some implementations, the user interface module 212 can be a set of instructions executable by the processor 235 to provide the functionality described below for generating graphical data for providing user interfaces to users. In some implementations, the user interface module 212 can be stored in the memory 237 of the computing device 200 and can be accessible and executable by the processor 235. The user interface module 212 may be adapted for cooperation and communication with the processor 235 and other components of the computing device 200 via signal line 242.

In some implementations, the user interface module 212 generates graphical data for providing a user interface that presents one or more recommended items to a user. The user interface module 212 sends the graphical data to a user device 115 or a mobile device 145, causing the user device 115 or the mobile device 145 to present the user interface to the user. An example user interface is shown in FIG. 5. The user interface module 212 may generate graphical data for providing other user interfaces to users.

As an example use of the system 100, the content application 103 generates news items relevant to a user and provides the news items to the user. For example, if a user's calendar event indicates that the user will travel to a destination at a particular future time, the content application 103 can provide various new items related to the destination to the user (e.g., flight updates, news related to airport closure, places of interest, local festivals, suggested itinerary, etc.).

In some instances, the content application 103 provides traffic alerts to the user. For example, if the user commutes to work via a bridge, the content application 103 may provide a news item to inform the user that the bridge is closed due to an accident and recommend a route path that allows the user to avoid the traffic congestion.

In some instances, the content application 103 determines that one or more images associated with a user relate to a particular location. The content application 103 recommends the user to combine the one or more images with a news item that refers to the same location. For example, the content application 103 suggests a user to publish a post that combines his or her Graceland images taken in 1996 with a news item discussing undergoing renovations in Graceland.

In some instances, the content application 103 provides location-based news to the user. For example, a location profile associated with the user indicates that the user lived in a community during a time period 1989-2003. The content application 103 determines one or more historical news items related to the community and published in the time period 1989-2003. The content application 103 determines one or more latest news items that relate to the same community and that share common subjects with the one or more historical news items. The content application 103 provides the one or more latest news items to the user. For example, the content application 103 determines that there was a local flood affecting the community during the user's stay in the community. The content application 103 determines one or more latest news items related to a flood that currently affects the community and provides the one or more latest news items to the user. The content application 103 may also provide one or more connecting suggestions to the user, allowing the user to connect to people living in the community via a social network. The content application 103 may list out possible volunteer opportunities for the user to help the community.

Figure 3:
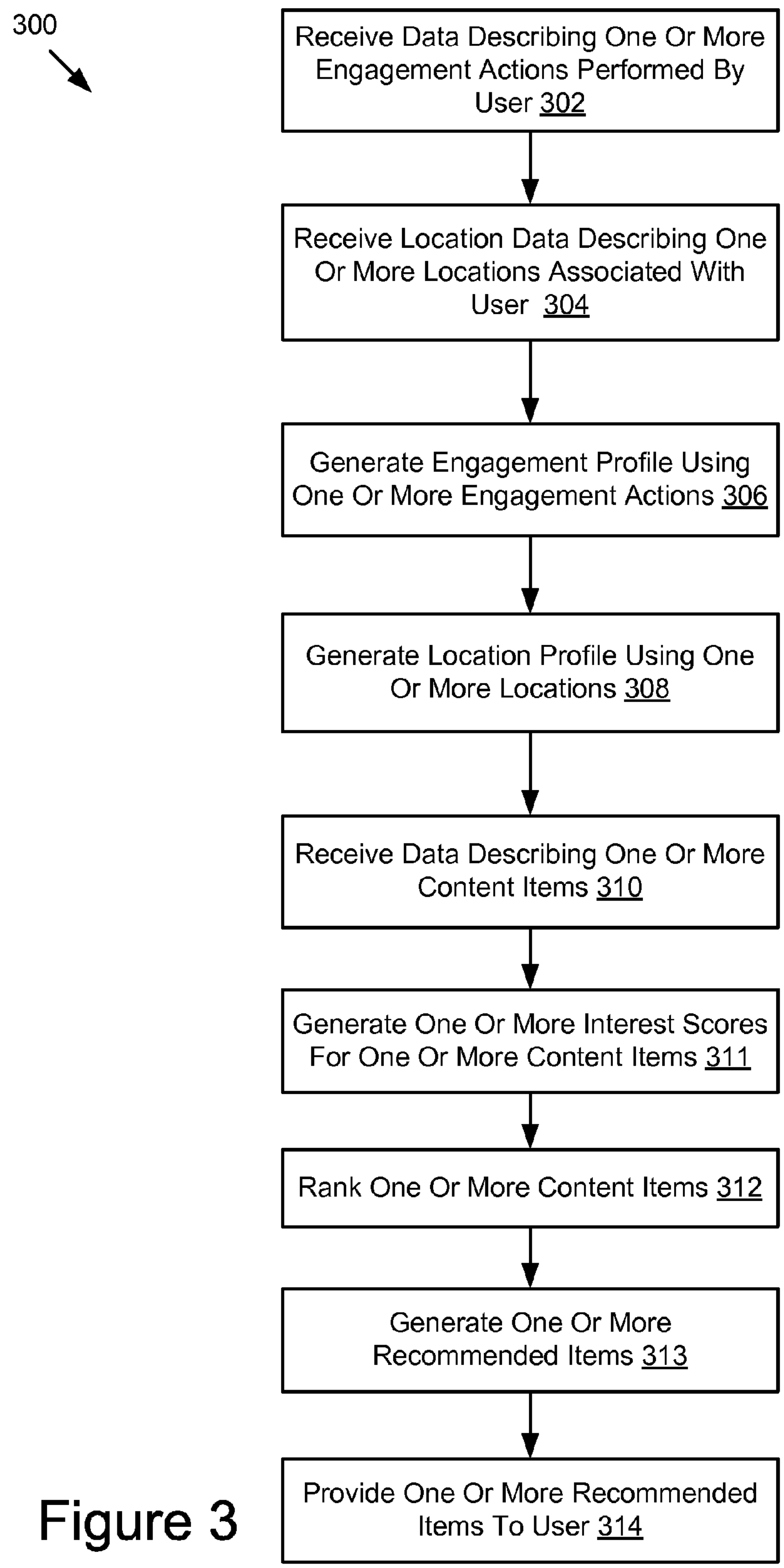
FIG. 3 is a flowchart of an example method for providing recommended content to a user.

FIG. 3 is a flowchart of an example method 300 for providing recommended content to a user. In some implementations, the controller 202 receives 302 data describing one or more engagement actions performed by a user. The controller 202 receives 304 location data describing one or more locations associated with the user. The engagement module 204 generates 306 an engagement profile for the user using the one or more engagement actions. The location module 206 generates 308 a location profile for the user using the one or more locations. The controller 202 receives 310 data describing one or more content items. The interest module 207 generates 311 one or more interest scores for the one or more content items based on the engagement profile and the location profile. The recommendation module 208 ranks 312 the one or more content items based on the one or more interest scores. The recommendation module 208 generates 313 one or more recommended items as content items having highest rankings The presentation module 210 provides 314 the one or more recommended items to the user.

Figure 4A:
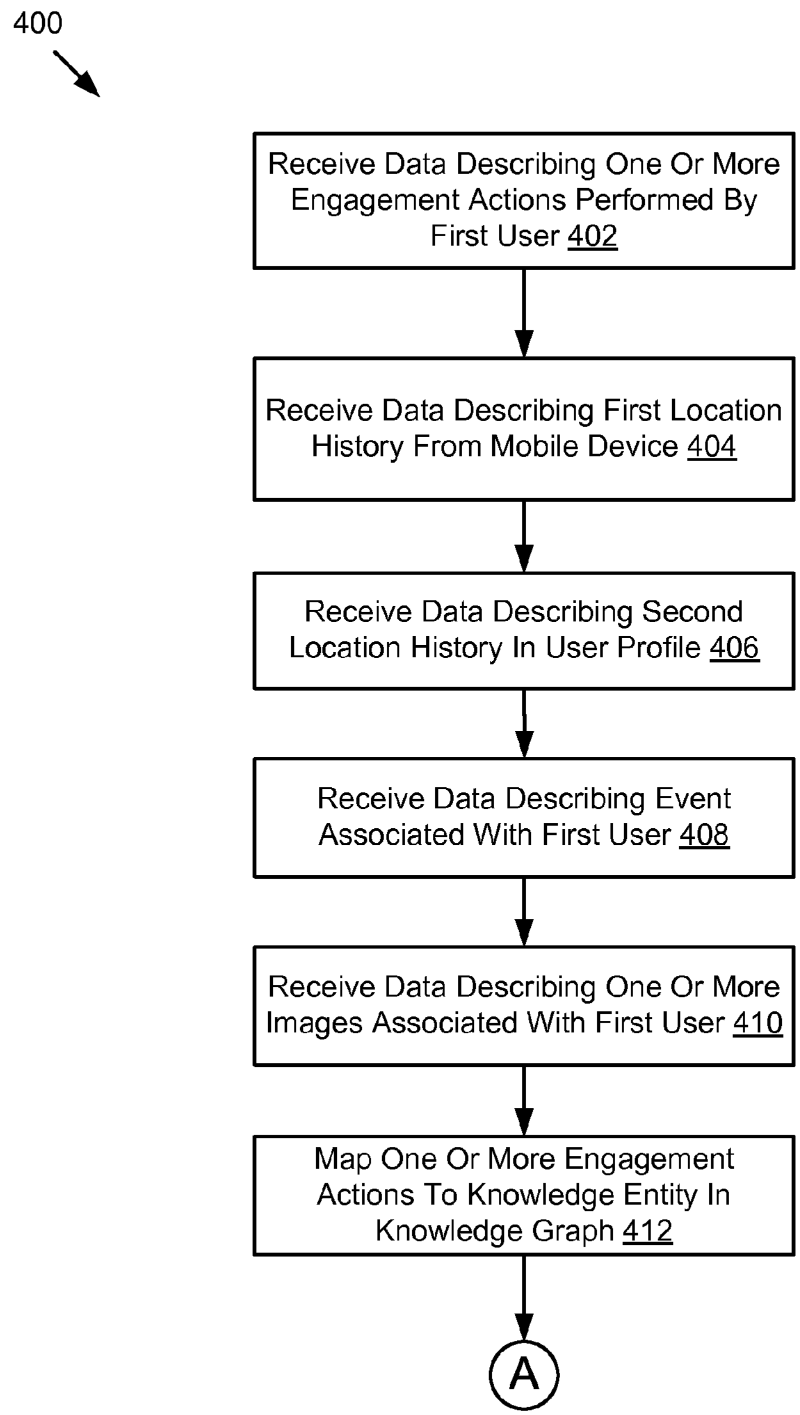
FIGS. 4A-4C are flowcharts of another example method for providing recommended content to a user.
Figure 4B:
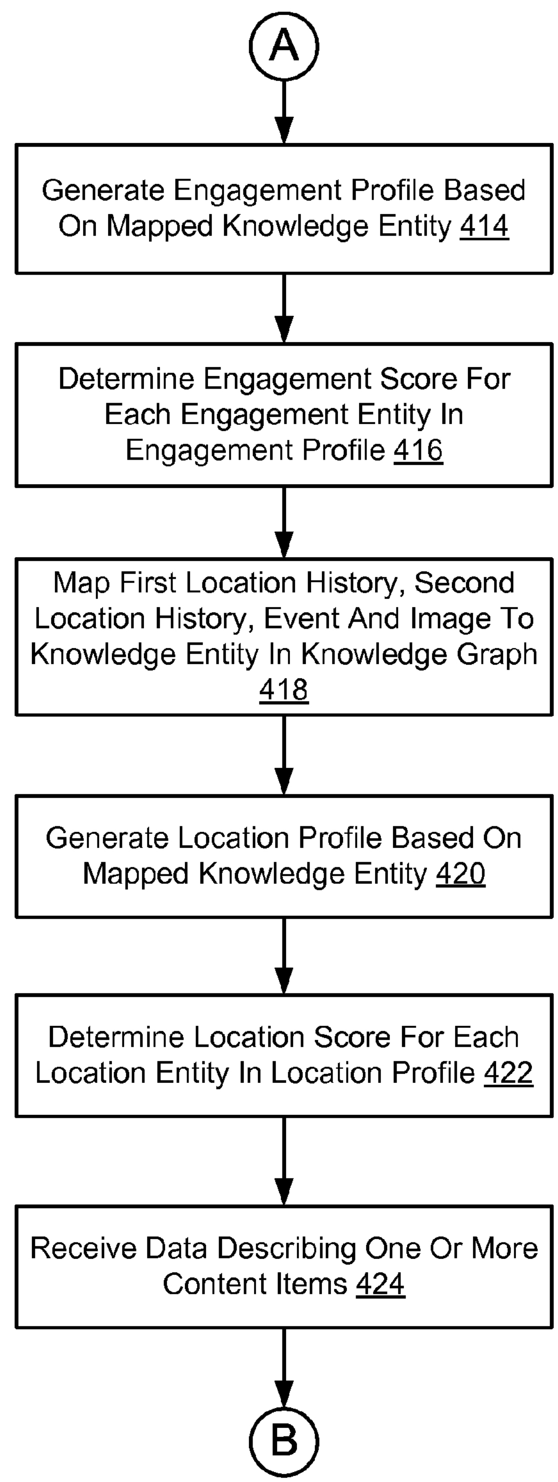
Figure 4C:
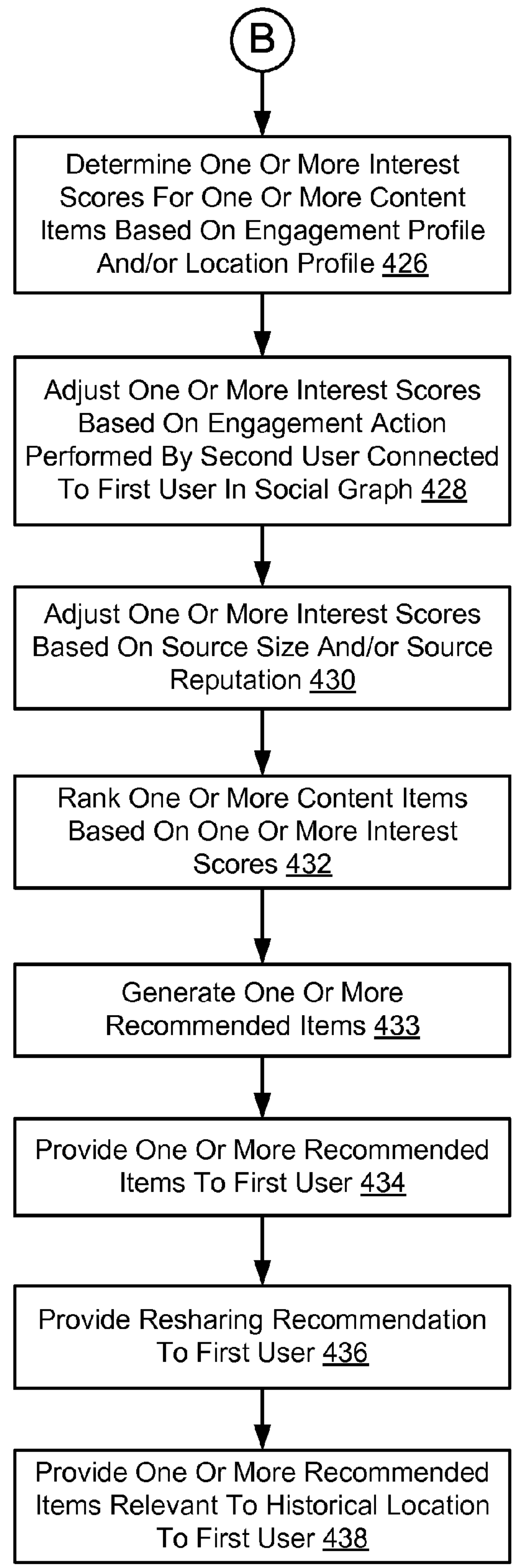

FIGS. 4A-4C are flowcharts of another example method 400 for providing recommended content to users. Referring to FIG. 4A, the controller 202 receives 402 data describing one or more engagement actions performed by a first user. The controller 202 receives 404 data describing a first location history associated with the first user from a mobile device 145. The controller 202 receives 406 data describing a second location history in a user profile associated with the first user from a social network server 101. The controller 202 receives 408 data describing one or more events associated with the first user. The controller 202 receives 410 data describing one or more images associated with the first user. The engagement module 204 maps 412 the one or more engagement actions to one or more knowledge entities in a knowledge graph.

Referring to FIG. 4B, the engagement module 204 generates 414 an engagement profile including one or more engagement entities based on the mapped knowledge entities. The engagement module 204 determines 416 an engagement score for each engagement entity in the engagement profile. The location module 206 maps 418 the first location history, the second location history, the one or more events and the one or more images to one or more knowledge entities in the knowledge graph. The location module 206 generates 420 a location profile including one or more location entities based on the one or more mapped knowledge entities. The location module 206 determines 422 a location score for each location entity in the location profile. The controller 202 receives 424 data describing one or more content items.

Referring to FIG. 4C, the interest module 207 determines 426 one or more interest scores for the one or more content items based on the engagement profile and/or the location profile. The interest module 207 adjusts 428 the one or more interest scores based on one or more engagement actions performed by one or more second users connected to the first user via a social graph. The interest module 207 adjusts 430 the one or more interest scores based on source sizes and/or source reputations associated with data sources that provide at least one of the one or more content items. The recommendation module 208 ranks 432 the one or more content items based on the one or more interest scores. The recommendation module 208 generates 433 one or more recommended items from the one or more content items. The presentation module 210 provides 434 the one or more recommended items to the first user. Optionally, the recommendation module 210 generates a resharing recommendation for the first user and the presentation module 210 provides 436 the resharing recommendation to the first user. Optionally, the presentation module 210 provides 438 the first user with one or more recommended items relevant to a historical location associated with the first user.

FIG. 5 is a graphic representation 500 of an example user interface for providing recommended content to a user. The example user interface includes top news in a community associated with the user and top tech news for the user.

In the above description, for purposes of explanation, numerous specific details are set forth in order to provide a thorough understanding of the specification. It will be apparent, however, to one skilled in the art that the disclosure can be practiced without these specific details. In other implementations, structures and devices are shown in block diagram form in order to avoid obscuring the description. For example, the present implementation is described in one implementation below primarily with reference to user interfaces and particular hardware. However, the present implementation applies to any type of computing device that can receive data and commands, and any peripheral devices providing services.

Reference in the specification to "one implementation" or "an implementation" means that a particular feature, structure, or characteristic described in connection with the implementation is included in at least one implementation of the description. The appearances of the phrase "in one implementation" in various places in the specification are not necessarily all referring to the same implementation.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present implementation of the specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware implementation, an entirely software implementation or an implementation containing both hardware and software elements. In a preferred implementation, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the implementations of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A method comprising:

receiving data describing one or more first engagement actions performed by a first user;

generating an engagement profile associated with the first user based on the one or more first engagement actions;

receiving data describing one or more images associated with the first user;

determining one or more locations associated with the one or more images;

generating a location profile associated with the first user based on the one or more locations;

receiving data describing one or more content items;

determining a degree of match between one or more subjects associated with the one or more content items and at least one of the engagement profile and the location profile;

determining one or more interest scores for the one or more content items based on the degree of match;

determining one or more recommended items from the one or more content items based on the one or more interest scores; and providing the one or more recommended items to the first user.

2. The method of claim 1, wherein generating the engagement profile comprises:

mapping the one or more first engagement actions to one or more knowledge entities in a knowledge graph;

generating the engagement profile including one or more engagement entities based on the one or more mapped knowledge entities; and determining an engagement score for each engagement entity in the engagement profile.

3. The method of claim 1, wherein generating the location profile comprises:

mapping the one or more locations to one or more knowledge entities in a knowledge graph;

generating the location profile including one or more location entities based on the one or more mapped knowledge entities;

associating the one or more location entities with the one or more timestamps; and determining a location score for each location entity in the location profile.

4. The method of claim 1, further comprising:

receiving data describing a first location history associated with the first user from a mobile device;

receiving data describing a second location history included in a user profile associated with the first user;

receiving data describing one or more events associated with the first user;

mapping the first location history, the second location history and the one or more events to one or more knowledge entities in a knowledge graph; and generating the location profile based on the one or more mapped knowledge entities.

5. The method of claim 1, further comprising:

determining a resharing recommendation for the first user, the resharing recommendation including data describing one or more second users recommended to the first user for sharing the one or more recommended items; and providing the resharing recommendation to the first user.

6. The method of claim 1, wherein the one or more images include temporal data describing one or more timestamps and wherein the location profile is also based on the one or more timestamps.

7. The method of claim 1, further comprising:

receiving data describing one or more second engagement actions performed by one or more second users that are connected to the first user in a social graph, the one or more second engagement actions associated with at least one of the one or more content items; and adjusting the one or more interest scores based on the one or more second engagement actions.

8. A system comprising:

a processor; and a memory storing instructions that, when executed, cause the system to:

receive data describing one or more first engagement actions performed by a first user;

generate an engagement profile associated with the first user based on the one or more first engagement actions;

receive data describing one or more images associated with the first user;

determine one or more locations associated with the one or more images;

generate a location profile associated with the first user based on the one or more locations;

receive data describing one or more content items;

determine a degree of match between one or more subjects associated with the one or more content items and at least one of the engagement profile and the location profile;

determine one or more interest scores for the one or more content items based on the degree of match;

determine one or more recommended items from the one or more content items based on the one or more interest scores; and provide the one or more recommended items to the first user.

9. The system of claim 8, wherein the instructions when executed cause the system to generate the engagement profile by:

mapping the one or more first engagement actions to one or more knowledge entities in a knowledge graph;

generating the engagement profile including one or more engagement entities based on the one or more mapped knowledge entities; and determining an engagement score for each engagement entity in the engagement profile.

10. The system of claim 8, wherein the instructions when executed cause the system to generate the location profile by:

mapping the one or more locations to one or more knowledge entities in a knowledge graph;

generating the location profile including one or more location entities based on the one or more mapped knowledge entities;

associating the one or more location entities with the one or more timestamps; and determining a location score for each location entity in the location profile.

11. The system of claim 8, wherein the instructions when executed cause the system to also:

receive data describing a first location history associated with the first user from a mobile device;

receive data describing a second location history included in a user profile associated with the first user;

receive data describing one or more events associated with the first user;

map the first location history, the second location history and the one or more events to one or more knowledge entities in a knowledge graph; and generate the location profile based on the one or more mapped knowledge entities.

12. The system of claim 8, wherein the instructions when executed cause the system to also:

determine a resharing recommendation for the first user, the resharing recommendation including data describing one or more second users recommended to the first user for sharing the one or more recommended items; and provide the resharing recommendation to the first user.

13. The system of claim 8, wherein the one or more images include temporal data describing one or more timestamps and wherein the location profile is also based on the one or more timestamps.

14. The system of claim 8, wherein the instructions when executed cause the system to also:

receive data describing one or more second engagement actions performed by one or more second users that are connected to the first user in a social graph, the one or more second engagement actions associated with at least one of the one or more content items; and adjust the one or more interest scores based on the one or more second engagement actions.

15. A computer program product comprising a non-transitory computer usable medium including a computer readable program, wherein the computer readable program when executed on a computer causes the computer to:

receive data describing one or more first engagement actions performed by a first user;

generate an engagement profile associated with the first user based on the one or more first engagement actions;

receive data describing one or more images associated with the first user;

determine one or more locations associated with the one or more images;

generate a location profile associated with the first user based on the one or more locations;

receive data describing one or more content items;

determine a degree of match between one or more subjects associated with the one or more content items and at least one of the engagement profile and the location profile;

determine one or more interest scores for the one or more content items based on the degree of match;

determine one or more recommended items from the one or more content items based on the one or more interest scores; and provide the one or more recommended items to the first user.

16. The computer program product of claim 15, wherein generating the engagement profile comprises:

mapping the one or more first engagement actions to one or more knowledge entities in a knowledge graph;

generating the engagement profile including one or more engagement entities based on the one or more mapped knowledge entities; and determining an engagement score for each engagement entity in the engagement profile.

17. The computer program product of claim 15, wherein generating the location profile comprises:

mapping the one or more locations to one or more knowledge entities in a knowledge graph;

generating the location profile including one or more location entities based on the one or more mapped knowledge entities;

associating the one or more location entities with the one or more timestamps; and determining a location score for each location entity in the location profile.

18. The computer program product of claim 15, wherein the computer readable program when executed on the computer causes the computer to also:

receive data describing a first location history associated with the first user from a mobile device;

receive data describing a second location history included in a user profile associated with the first user;

receive data describing one or more events associated with the first user;

map the first location history, the second location history and the one or more events to one or more knowledge entities in a knowledge graph; and generate the location profile based on the one or more mapped knowledge entities.

19. The computer program product of claim 15, wherein the computer readable program when executed on the computer causes the computer to also:

determine a resharing recommendation for the first user, the resharing recommendation including data describing one or more second users recommended to the first user for sharing the one or more recommended items; and provide the resharing recommendation to the first user.

20. The computer program product of claim 15, wherein the computer readable program when executed on the computer causes the computer to also:

receive data describing one or more second engagement actions performed by one or more second users that are connected to the first user in a social graph, the one or more second engagement actions associated with at least one of the one or more content items; and adjust the one or more interest scores based on the one or more second engagement actions.

* * * * *